Jan. 25, 1955
W. L. AMES
2,700,448
ARTICLE HANDLING APPARATUS
Filed April 22, 1953
3 Sheets-Sheet 1
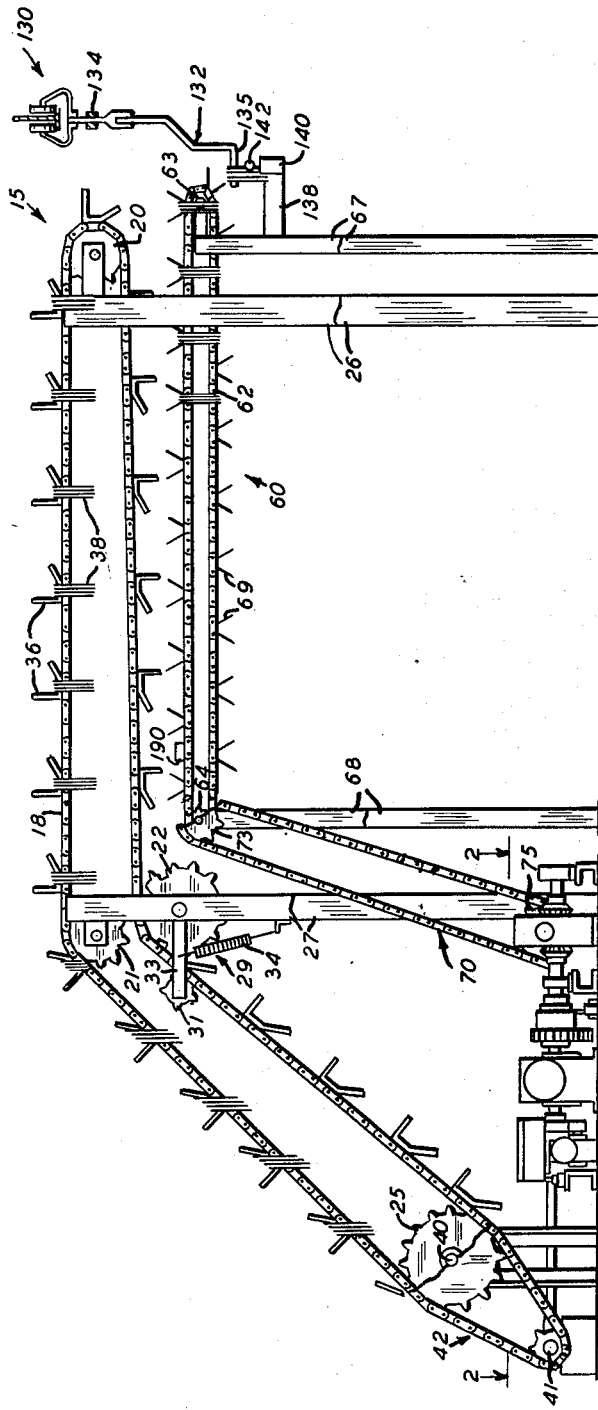
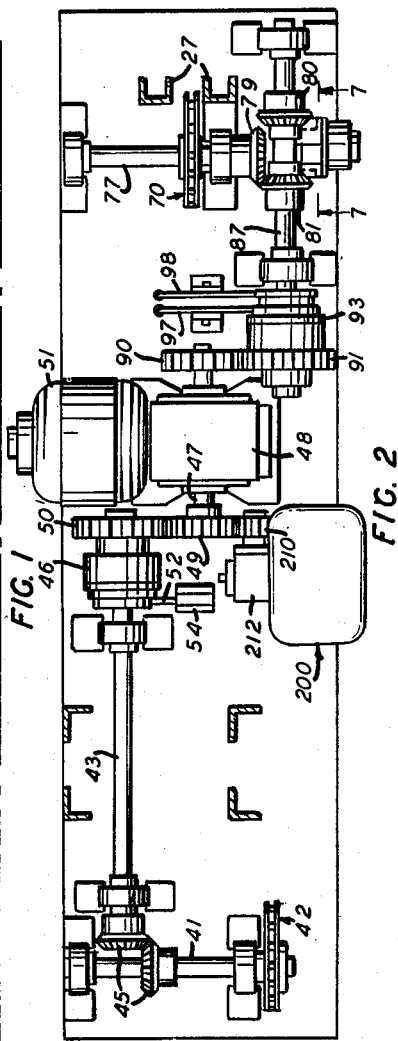
INVENTOR
W. L. AMES
BY
ATTORNEY

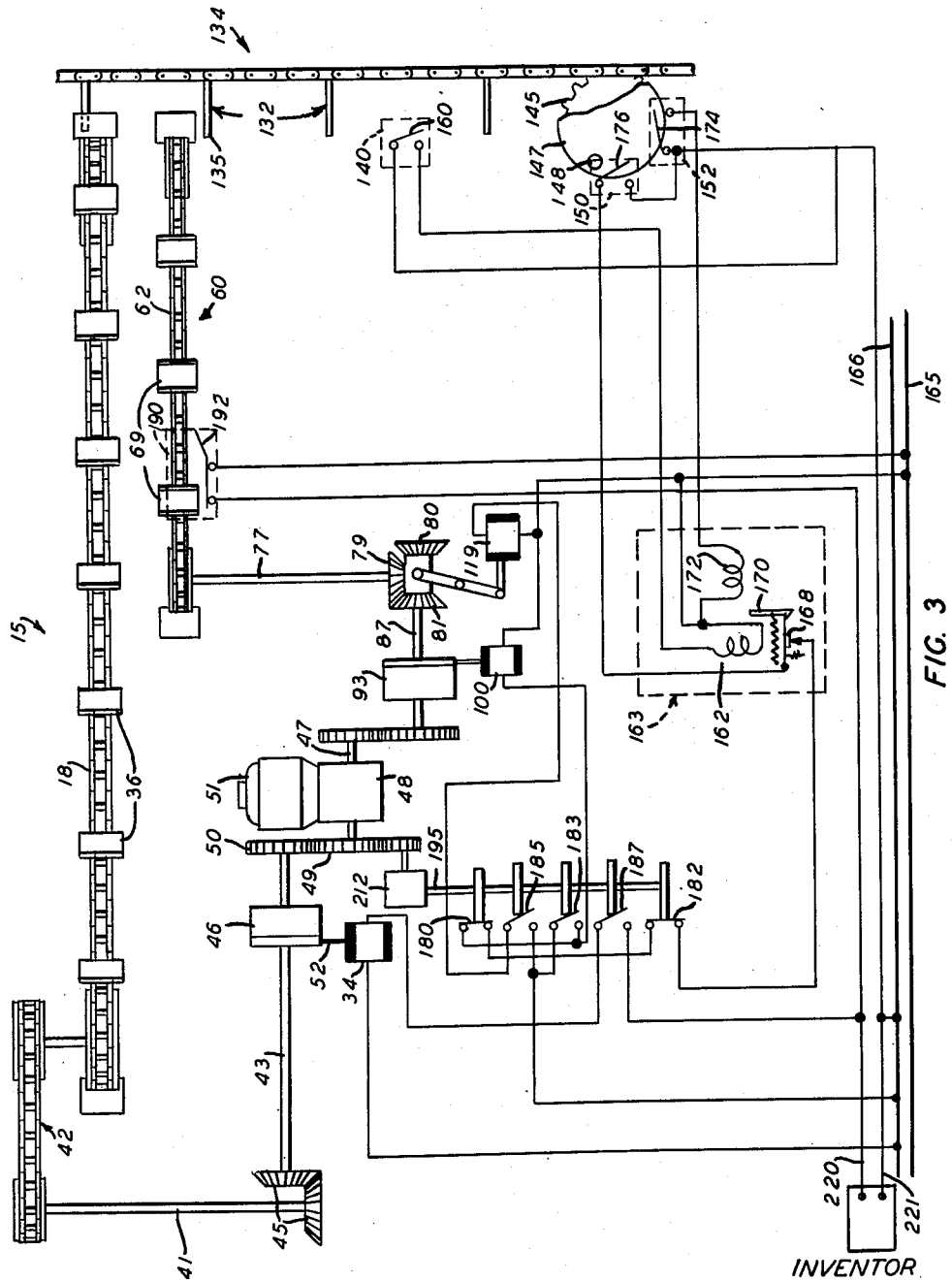

Jan. 25, 1955  W. L. AMES  2,700,448
ARTICLE HANDLING APPARATUS
Filed April 22, 1953  3 Sheets-Sheet 3

INVENTOR
W. L. AMES
BY [signature]
ATTORNEY

United States Patent Office 2,700,448
Patented Jan. 25, 1955

2,700,448

ARTICLE HANDLING APPARATUS

William L. Ames, Middle River, Md., assignor to Western Electric Company, Incorporated, New York, N. Y., a corporation of New York Application April 22, 1953, Serial No. 350,419

6 Claims. (Cl. 198—21)

This invention relates to article handling apparatus, and more particularly to apparatus for transferring articles to continuously operated conveyors.

In the manufacture of certain electrical equipment, it has been found necessary to transport bundles comprising a predetermined number of electrical cords from a supply station to a plurality of operating stations in remote sections of a plant. To meet this requirement, a continuously operated monorail conveyor may be provided having a plurality of spaced carrier hooks which travel in an endless path past the supply station and the operating stations. At the operating stations the cord bundles carried by the hooks may be removed therefrom in accordance with the requirements of the individual stations.

At the supply station a cord measuring and cutting machine continuously measures and cuts cordage into cords of a predetermined length. In order to insure adequate supplies of cords at each of the operating stations, it is necessary to provide apparatus for automatically transferring bundles comprising a predetermined number of cords from the cord measuring and cutting machine to empty hooks on the monorail conveyor. The problem of providing such apparatus is complicated by the fact that, depending upon the requirements of the operating stations, it may happen that a carrier hook will return to the transfer point still carrying a bundle. Since the cord measuring and cutting machine is normally continuously operated, means must be provided for coordinating the supply of bundles with the demand therefor.

An object of this invention is to provide new and improved article handling apparatus.

Another object of this invention is to provide new and improved apparatus for transferring articles to continuously operated conveyors.

Article handling apparatus for transferring articles from a first conveyor to a second conveyor illustrating certain features of the invention may include an intermediate storage conveyor, means for periodically indexing the storage conveyor in one direction for receiving the article deposited thereupon by the first conveyor, and means selectively operable for indexing the storage conveyor in the opposite direction to unload an article therefrom onto the second conveyor.

A complete understanding of the invention may be obtained from the following detailed description of apparatus forming a specific embodiment thereof, when read in conjunction with the appended drawings, in which:

Fig. 1 is a side elevation of the article handling apparatus with parts broken away for clarity;

Fig. 2 is an enlarged, fragmentary, horizontal section taken along line 2—2 of Fig. 1;

Fig. 3 is a schematic electromechanical diagram illustrating certain features of the invention;

Figure 4:
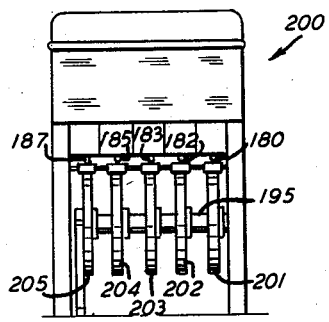
Fig. 4 is an enlarged, fragmentary, vertical section taken along line 4—4 of Fig. 2.

Referring now to Fig. 1, which illustrates a preferred embodiment of the invention, a supply conveyor shown generally at 15, includes an endless link chain 18 which is driven about a plurality of idler sprockets 20, 21 and 22 by a drive sprocket 25. The idler sprockets 20 and 21 are rotatably supported between two pairs of spaced support columns 26—26 and 27—27, respectively, the idler sprocket 22 being rotatably mounted between the columns 26—26.

A chain tensioning device, shown generally at 29, insures a positive intermeshing engagement of the chain 18 with the toothed periphery of the idler sprocket 22, and includes a sprocket 31 rotatably mounted on the free end of a support arm 33 which is pivotally mounted at its opposite end on one of the columns 27. The sprocket 31 is urged into engagement with the lower leg of the endless chain 18 by a tension spring 34 and in turn urges the chain into engagement with the idler sprocket 22.

Fixedly attached to the endless chain 18 at equally spaced intervals therealong are a plurality of pallets 36—36 designed for receiving individual bundles 38—38 of cords which are periodically deposited on the pallets by an automatically operated cord measuring and cutting machine (not shown) positioned adjacent to the left end of the supply conveyor 15.

The drive sprocket 25 is mounted on a transversely extending, horizontally disposed shaft 40 (Fig. 2) which is rotatably driven from a drive shaft 41 by means of a chain drive shown generally at 42. The drive shaft 41 is connected to a main drive shaft 43 by means of bevel gears 45—45. A conventional single-revolution clutch 46 is selectively operable for connecting the drive shaft 43 to one end of a longitudinally extending output shaft 47 of a gear reduction unit 48 through intermeshing gears 49 and 50. The input to the gear reduction unit 48 is supplied by a continuously operating electric drive motor 51. The above-described power transmission arrangement permits single-revolution operation of the main drive shaft 43 by the motor 51 whenever a detent 52 associated with the clutch 46 is tripped by the selective actuation of a solenoid 54. The detent 52 normally prevents the engagement of the clutch 46 for rotation of the shaft 43. However, when the solenoid 54 is momentarily energized, the detent 52 releases the clutch for engagement with the shaft 43 for a single-revolution, whereupon the clutch is again disengaged, provided that the solenoid 54 is again de-energized.

When the clutch 46 is engaged, the drive shaft 43 is driven by the electric motor 51 to drive the endless chain 18 in a direction such that the upper leg of the chain advances from left to right, as viewed in Fig. 1. During a single-revolution of the shaft 43, the carrier pallets 36—36 are moved ahead a predetermined distance equal to the spacing between adjacent pallets on the chain 18. Each movement of the chain 18 indexes the pallets 36—36 successively, one at a time, into an "unloading position" at the extreme right end of the supply conveyor 15 wherein the bundle 38 associated with a pallet occupying this position is discharged therefrom.

As shown in Fig. 1, the right hand section of the conveyor 15, between the pairs of support columns 26—26 and 27—27, is generally horizontally disposed. Positioned directly beneath the lower leg of the horizontally disposed section of the supply conveyor 15 is a horizontally disposed, longitudinally extending storage conveyor, shown generally at 60. The storage conveyor 60 includes an endless link chain 62 arranged to travel about a pair of longitudinally spaced sprockets 63 and 64 rotatably mounted between two pairs of spaced upright supports 67—67 and 68—68. Secured to the chain 62 at equally spaced intervals therealong are a plurality of generally U-shaped carriers 69—69 arranged to receive the individual cord bundles 38—38 deposited therein from the supply conveyor 15.

The right end of the storage conveyor 60 projects a short distance beyond the right end of the supply conveyor 15 so as to enable the successive positioning of the carriers 69—69, one at a time, beneath a pallet 36 in the "unloading position" at the right end of the supply conveyor. The spacing and the movement of the carriers 69—69 is such that an empty carrier 69 is always positioned for receiving a cord bundle dropped from the supply conveyor.

Figure 6:
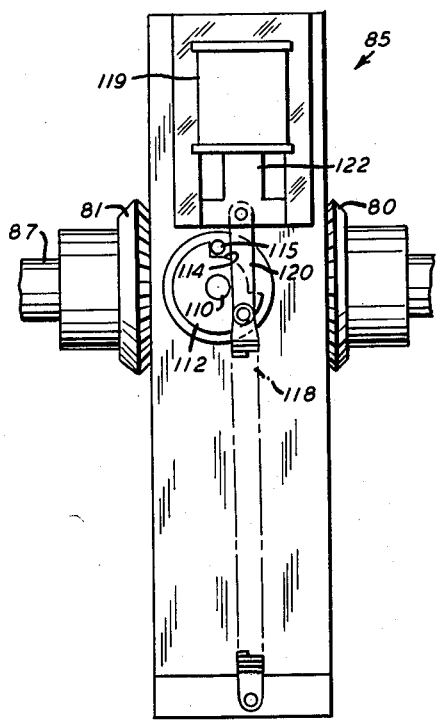
Fig. 6 is an enlarged side elevation of a reversing mechanism shown in Fig. 1.
Figure 7:
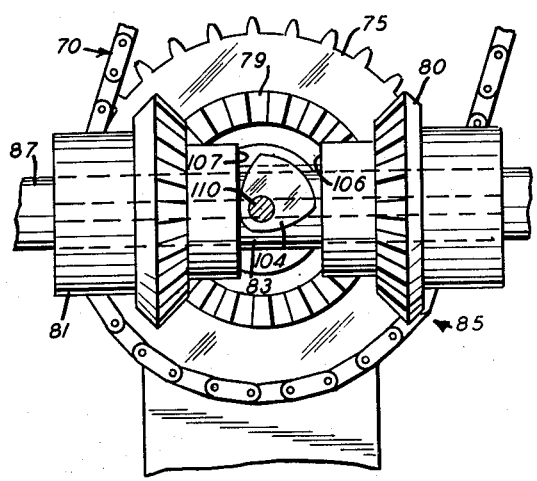
Fig. 7 is an enlarged, fragmentary, vertical section taken along line 7—7 of Fig. 2.

The endless chain 62 of the storage conveyor 60 is driven by means of a chain drive, shown generally at 70, which includes a driven sprocket 73 operatively connected to the sprocket 64 at the left end of the storage conveyor, and a driver sprocket 75 fixedly mounted on a horizontally disposed, transversely extending journaled shaft 77. Keyed to one end of the shaft 77 is a bevel gear 79 arranged to be selectively driven in either direction by one or the other of a pair of opposed miter gears 80 and 81. The miter gears 80 and 81 are joined together in spaced relationship with respect to each other by a sleeve 83 to form a part of a reversing clutch assembly designated 85 (Figs. 6 and 7). The miter gears 80 and 81, together with their interconnecting sleeve 83, are slidably keyed to a longitudinally extending drive shaft 87 transversely disposed with respect to the shaft 77.

Figure 5:
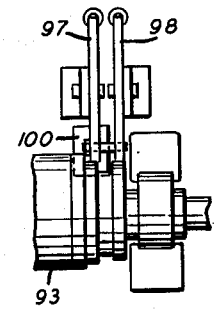
Fig. 5 is an enlarged, fragmentary, plan view of a portion of the apparatus shown in Fig. 2.

The drive shaft 87 is operatively connected to the right end of the output shaft 47 of the gear reduction unit 48 through intermeshing gears 90 and 91 and a conventional single-revolution clutch 93, and may be driven by the drive motor 50 for a single-revolution by momentarily disengaging spring-biased latches 97 and 98 which normally prevent the engagement of the clutch 93 with the shaft 87. The latches 97 and 98 (Fig. 5) are interconnected and selectively operated by a single clutch solenoid 100 which when energized pivots the latches 97 and 98 to disengage their detent portions from complementary detent engaging portions on the clutch 93.

Referring now to the details of the reversing clutch assembly 85 shown in Figs. 6 and 7, the opposed miter gears 80 and 81 are selectively and axially movable on the drive shaft 87 between a forward running position, wherein the miter gear 81 engages the bevel gear 79 and a reverse running position wherein the miter gear 80 engages the bevel gear 79. This axial movement of the miter gears 80 and 81 is accomplished by means of an eccentric cam 104 (Fig. 7) positioned between opposed shoulders 106 and 107 on the miter gears 80 and 81, respectively.

The eccentric cam 104 is fixedly mounted on a transversely extending operating shaft 110 for rotation therewith. The shaft 110 is arranged to be angularly rotated between predetermined limits by means of a disc 112 keyed to the opposite end thereof. The disc 112 is formed with an arcuate cutout portion 114 designed to receive a projecting stop pin 115 which confines the angular movement of the disc between the limits of the cutout portion. The disc 112 is normally urged to an extreme clockwise position, as viewed in Fig. 6, against the stop pin 115 by means of a tension spring 118 attached at one end to an eccentric point on the disc. With the disc in this extreme clockwise position, the cam 104 holds the miter gear 81 in engagement with the bevel gear 79 whereby rotation of the drive shaft 87 will operate the storage conveyor in a forward direction to move the carriers 69—69 from left to right along the top leg of the chain 62, as viewed in Fig. 1.

The engagement of the miter gear 80 with the bevel gear 79 may be accomplished by selectively energizing a solenoid 119 which is operatively connected to the disc 112 by a crank arm 120 which is pivotally and eccentrically attached to the disc. Upon energization of the solenoid 119, it is arranged to raise its associated plunger 122 connected to the crank arm 120, thereby rotating the disc 112 counterclockwise until it is in its extreme counterclockwise position against the stop pin 115. The resulting angular movement of the cam 104 slides the miter gear 80 axially and into engagement with the bevel gear 79 whereby subsequent rotation of the drive shaft 87 will operate the storage conveyor in the reverse direction.

Referring again to Fig. 1, a monorail conveyor 130 is transversely positioned adjacent to the right end of the storage conveyor 60. Pendantly mounted on the monorail conveyor are a plurality of equally spaced carrier hooks, one of which designated 132 is shown in Fig. 1. The carrier hooks 132—132 are attached to a tractor chain 134 which is continuously driven at a constant speed to advance the carrier hooks successively past the end of the storage conveyor 60.

Each carrier hook 132 is provided with a bundle engaging hook portion 135 (Fig. 1) which projects laterally therefrom so as to pass directly beneath a carrier positioned at a "bundle transfer" point at the extreme right end of the storage conveyor. In a manner hereinafter to be described, the storage conveyor 60 may be operated to move a loaded carrier into the "bundle transfer" position as an empty carrier hook advances therebeneath, whereby the bundle 38 associated with this particular carrier falls therefrom and onto the laterally extending hook portion 135. The ends of the individual cords of a bundle 38 straddle the hook portion 135 and dangle down a short distance at either side below the horizontal plane described by the advancing hook portion.

Mounted on a support bracket 138 projecting laterally from an upright support 67 to a point adjacent to the path of the advancing hook portion 135 of a carrier hook is an inspection switch 140 having an actuator 142 arranged to be operated by the dangling ends of a cord bundle 38 supported by the hook. The inspection switch 140 is so positioned that its actuation by a loaded conveyor hook occurs prior to the arrival of the advancing hook at a point immediately opposite the carrier unloading position.

Suitably mounted on a support structure (not shown) is a rotatable sprocket 145 (Fig. 3) which is positioned for intermeshing, driving engagement with the continuously moving tractor chain 134. Keyed to the sprocket for rotation therewith is a cam 147 having an upwardly projecting pin 148 designed to successively operated a spring-biased trip switch 150 and a spring-biased reset switch 152 in timed relationship with respect to the advancing tractor chain 134 and the carrier hooks 132—132. The movement of the tractor chain 134 causes the cam 147 to rotate in a counterclockwise direction (as viewed in Fig. 3) in synchronism with the moving chain 134. The arrangement of the cam 147 and switches 150 and 152 is such that the switch 150 is momentarily actuated everytime a carrier hook advances to a point immediately adjacent to the "bundle transfer" position at the right end of the storage conveyor 60. The switch 152 is momentarily actuated a short time later immediately after the particular carrier hook has advanced past the "bundle transfer" point.

The switches 150 and 152, together with inspection switch 140 form parts of an electrical circuit, shown schematically in Fig. 3, which controls the operation of the apparatus in a manner hereinafter to be described in detail. Referring now to the electrical circuit shown in Fig. 3, the inspection switch 140 is provided with a normally open contact 160 which is connected in series with a solenoid coil 162 of a conventional memory relay 163 across power supply lines 165 and 166. Energization of the solenoid coil 162 moves a pivotally mounted, normally closed contact 168 counterclockwise to an open position wherein it is held by a spring-biased latch 170. The contact 168 may be reset to its normally closed position by energizing a solenoid reset coil 172 which is connected in series with a normally open contact 174 of the switch 152 across lines 165 and 166.

One side of the normally closed contact 168 in the memory relay is connected in series with a normally open contact 176 of the trip switch 150 to the line 166. The other side of the contact 168 is connected to the line 165 through a series connection of a normally closed, cam operated contact 180, a normally closed, cam operated contact 182 and a clutch solenoid 100 which controls the operation of the clutch 93.

A normally open, cam operated contact 183 is connected in parallel with the series-connected contacts 180, 182, 168 and 176 and when the contact 183 is closed it shunts them. The solenoid 119 which operates the reversing clutch is connected across the lines 165 and 166 in series with a normally open, cam operated contact 185. The solenoid 54 which operates the single-revolution clutch 46 is connected across the lines 165 and 166 through a series arrangement of a normally open, cam operated contact 187 and a normally closed contact 189 of a limit switch 190.

The limit switch 190 is positioned adjacent to the upper leg of the chain 62 of the storage conveyor near its left end. The switch 190 is provided with a leaf type actuator 192 which is positioned for detecting the presence of a bundle of cords on a carrier occupying a position immediately adjacent thereto. The actuator 192 is operated by the dangling ends of a cord bundle on a carrier in such a position to open an associated normally closed contact 193.

As mentioned above, the contacts 180, 182, 183, 185 and 187 are cam operated. A cam shaft 195 (Fig. 3) of a timing unit 200 provided with a plurality of cams 201, 202, 203, 204 and 205, is continuously driven from the output shaft 47 through intermeshing gears 49 and 210 and a gear box 212. The speed of the cam shaft 195 for the purposes of illustration bears a 1:10 ratio with respect to the speeds of the shafts 43 and 87 when driven. The shafts 43 and 87 are capable of ten revolutions per revolution of the cam shaft. During each complete cycle of the cam shaft 195, the cams 201 to 205, inclusive, operate the individual contacts 180, 182, 183, 185 and 187, respectively, in a predetermined sequence.

Operation

In operation, a predetermined number of cords per unit time are individually deposited by the cord measuring and cutting machine onto a pallet 36 positioned adjacent thereto to form a cord bundle. At the end of a predetermined time interval, the fully loaded pallet 36 may be indexed ahead from left to right along the top leg of the supply conveyor until the next succeeding pallet 36 is positioned to receive cords from the cutting and stripping machine. Each time the pallets 36—36 are indexed ahead, one of the pallets is moved into the "pallet unloading" position, wherein it drops its associated cord bundle into an empty carrier 69 positioned therebeneath on the storage conveyor 60.

For the purpose of illustrating the operation of the apparatus, it will be assumed that the predetermined number of cords constituting a full bundle are delivered to a pallet 36 positioned adjacent to the cord measuring and cutting machine every twenty seconds. Hence, as long as the cord measuring and cutting machine is running, it is necessary that the supply conveyor 15 be indexed ahead once every twenty seconds, so that the bundles each contain the predetermined number of cords. The gear ratio of the drive of the cam shaft 195 is such that it makes one revolution every twenty seconds, whereby complete cyclic sequence of operation of the contacts 180, 182, 183, 185 and 187 is repeated every twenty seconds.

It will be further assumed that the tractor chain 134 is driven at a linear speed of fifteen feet per minute and that the carrier hooks 132—132 are spaced at uniform intervals of twelve inches along the chain 134. The monorail conveyor 130 follows an endless path past operating stations at remote points, at each of which a bundle of cords may or may not be removed from a carrier hook. Thus, one carrier hook 132, which may be either loaded or empty, advances past the "bundle transfer" point at the right end of the storage conveyor 60 every four seconds.

The sequence of operation of the cam operated contacts 180, 182, 183, 185 and 187 is such that at the start of a cycle the contact 180 is opened, the contacts 183, 185 and 187 being previously opened. Assuming that the carrier positioned adjacent to the limit switch 190 does not have a bundle 38 loaded thereon, the contact 193 of the limit switch is in its normally closed condition and the cutting and tipping machine remains in operation being energized from bus lines 220 and 221. Due to the open contacts 180 and 183, the clutch 93 controlling the operation of the storage conveyor 60 is rendered inoperative since the circuit containing the clutch solenoid 100 cannot be completed. Thus, although carrier hooks are continuously moving past the carrier transfer position at the right end of the storage conveyor 60 and the contact 176 of the trip switch 150 is periodically momentarily operated to a closed position, the clutch solenoid 100 will remain inoperative despite the fact that a particular carrier hook may be empty.

After 2.22 seconds of the cycle have elapsed, the contact 185 closes to energize the solenoid 119 which engages the bevel gear 79 with the miter gear 80, whereby subsequent rotation of the drive shaft 87 will cause the storage conveyor 60 to operate in the reverse direction, the carriers on the upper leg of the storage conveyor indexing from right to left as viewed in Fig. 1.

At 2.5 seconds from the start of the cycle, the contact 183 closes and the contact 182 opens. The closing of the contact 183 energizes the solenoid 100 which trips the latches 97 and 98 to permit the clutch 93 to engage and drive the shaft 87 for a single-revolution. As mentioned above, the gears 79 and 81 are engaged at this time and the single-revolution of the shaft 87 indexes the carriers one step to the left (as viewed in Fig. 1) causing an empty carrier to be positioned beneath the right end of the supply conveyor 15 for receiving a bundle dropped from a loaded pallet subsequently indexed into the dumping position.

At the end of 3.34 seconds of the cycle, the contact 180 returns to its normally closed position. The contact 187 is closed after 4 seconds of the cycle have elapsed and simultaneously therewith the contact 183 is opened to de-energize the solenoid 100. It will be noted that the lapse of time during which the solenoid 100 remained energized was insufficient to permit a second revolution of the shaft 87.

When the contact 187 closes, the solenoid 54 is energized to trip the detent 52 and permit the engagement of the clutch 46 for one revolution of the shaft 43. The movement of the shaft 43 through one revolution indexes a loaded carrier pallet into the "unloading position" wherein it discharges its associated cord bundle 38 onto the empty carrier 69 which was previously positioned therebeneath for receiving the bundle by the previous single-revolution operation of the shaft 57. It will be noted that the indexing of the carrier pallets 36—36 causes an empty pallet to be positioned adjacent to the cord cutting and stripping machine for receiving individual cords therefrom.

At the end of 5.5 seconds of the cycle, the contact 187 reopens and immediately thereafter the switch 185 reopens to de-energize the solenoid 119. Upon de-energization of the solenoid 119, the gear 81 is engaged with the bevel gear 79, whereby subsequent operation of the shaft 87 will index the carriers 69—69 in the forward direction, from left to right, along the top leg of the storage conveyor 60. At the end of 6½ seconds after the start of the cam shaft cycle, the contact 182 recloses and the circuit is then conditioned for a transfer operation the next time an empty carrier hook approaches the transfer position at the right end of the storage conveyor 60.

As previously mentioned, the carrier hooks advancing past the unloading position may be either carrying a cord bundle or empty. If at any time during the latter 13½ seconds of the cam shaft cycle an empty hook approaches the "bundle transfer" position, the contact 176 of the trip switch 150 is momentarily closed by the pin 148 of the cam 147 to energize the solenoid 100 to operate the storage conveyor 60 and index a carrier 69 from left to right into the "bundle transfer" position wherein it discharges its associated cord bundle onto the advancing empty carrier hook just as it reaches this point. The bundle falls onto the hook and straddles the laterally projecting bent end portion thereof with the ends of the individual cords dangling down a short distance below the plane described by the end portion.

If during the latter 13½ seconds of the cycle of the cam shaft 195 a loaded conveyor hook should approach the "bundle transfer" position, the dangling ends of its associated cord bundle will strike the actuator 142 of the inspection switch 140 prior to the operation of the trip switch 150 by the cam 147. When the switch 140 is operated, its associated contact 160 is momentarily closed to energize the solenoid coil 172, which upon energization pulls the contact 168 downwardly into a position wherein it is held engaged by the projecting abutment portion of the spring-biased latch 170. Hence, when the contact 176 of the switch 150 is subsequently momentarily closed, it has no effect because the circuit containing the solenoid 100 is broken at the open contact 176.

However, immediately after the carrier hook 132 passes the transfer point adjacent to the right end of the storage conveyor 60, the cam 147 momentarily closes the contact 174 of the reset switch 152. When the contact 174 is momentarily closed, the solenoid coil 172 is energized to rotate the pivoted latch counterclockwise releasing the spring-biased contact 168, which closes to recondition the tripping circuit. When the next carrier hook approaches the "bundle transfer" point and this particular hook is empty, the closing of the contact 176 of the trip switch 150 will energize the solenoid 100 to index the carriers on the storage conveyor 60, one position from left to right. The indexing movement of the storage conveyor brings a loaded carrier into the transfer position just as the advancing empty carrier hook arrives at the transfer point to receive the bundle which falls from the carrier. After the now loaded carrier hook leaves the loading point, the reset switch 152 is again operated to recondition the tripping circuit.

As previously mentioned, the time required for one revolution of the shaft 87 to index the storage conveyor one step is one-tenth of that required for a complete 360° cycle of the cam shaft 195, that is, a complete indexing operation of the storage conveyor 60 requires only two seconds. Hence, three or possibly four carrier hooks may be loaded during the thirteen and one-half seconds remaining in the complete twenty second cycle of the cam shaft 195.

Attention is directed to the fact that the indexing operation of the storage conveyor to move a carrier into the unloading position may be initiated by the momentary closing of the contact 176 as late as 360° in the cycle of the cam shaft 195, immediately prior to the opening of the contact 180 at this point. Hence, it is possible that an indexing operation of the storage conveyor 60 may continue until as late as two seconds into the next cycle of the cam shaft 195.

Since only one bundle is delivered from the supply conveyor 15 to the storage conveyor 60 per cycle of the cam shaft 195, the loading of more than one carrier hook per cycle cannot occur unless the storage conveyor has in storage at that time the number of cord bundles in excess of the one delivered by the supply conveyor 15 during the cycle. It is manifest that, if none of the hooks advancing past the transfer point during the last thirteen and one-half seconds of the cycle of the cam shaft 195 is empty, a bundle deposited by the supply conveyor 15 will be indexed on its carrier from right to left along the top leg of the storage conveyor 60 and stored on the storage conveyor 60.

The storage capacity of the conveyor 60 is manifestly limited by the length of the top leg of the conveyor. When a loaded carrier 69 reaches a point near the left end of the conveyor 60, adjacent to the limit switch 190, the actuator 192 of the switch is operated by the dangling cords to open the contact 198. This arrangement prevents further operation of the supply conveyor 15 until the particular loaded carrier positioned adjacent to the limit switch 190 is again indexed one step to the right. The opening of the contact 198 of the limit switch also breaks the power supply to the cord cutting and tipping machine to stop the operation of this machine.

It will be understood that this invention is not limited to the specific details described in connection with the above embodiment of the invention. It is manifest that various modifications may be made within the spirit and scope of the invention.

What is claimed is:

1. Apparatus for transferring bundles of cords from a supply thereof to carrier hooks continuously advancing along a monorail conveyor, which comprises a supply conveyor for transporting individual bundles of cords from the supply thereof, means for periodically indexing the supply conveyor, the indexing movement normally causing a leading bundle positioned on the supply conveyor to be discharged therefrom, an intermediate storage conveyor comprising an endless chain and a plurality of bundle receiving pallets attached to the chain at uniformly spaced intervals therealong, means periodically operated in timed relationship with the supply conveyor indexing means for indexing the endless chain of the storage conveyor in one direction to position an empty pallet for receiving a bundle discharged from the supply conveyor, and means for periodically indexing the endless chain in the opposite direction to transfer a bundle from a loaded pallet on the storage conveyor onto an empty carrier hook on the monorail conveyor.

2. Apparatus for transferring bundles of cords from a supply thereof to carrier hooks continuously advancing along a monorail conveyor, which comprises a supply conveyor for transporting individual bundles of cords from a supply thereof, means for periodically indexing the supply conveyor to cause a leading bundle positioned on the supply conveyor to be discharged therefrom, an intermediate storage conveyor positioned to receive bundles discharged from the supply conveyor, said intermediate conveyor including an endless chain and a plurality of uniformly spaced, bundle receiving pallets attached to the chain, means for automatically periodically indexing the endless chain of the intermediate storage conveyor in one direction to position an empty pallet for receiving a bundle discharged from the supply conveyor, means operable during a predetermined portion of the time interval between successive indexing movements of the supply conveyor for indexing the endless chain of the storage conveyor in the opposite direction to discharge a bundle from a leading pallet thereon, means for actuating the last-mentioned indexing means when an empty advancing carrier hook is positioned for receiving a bundle discharged from the leading pallet on the storage conveyor to transfer the bundle to the hook, and means actuated when a full carrier hook approaches the discharge end of the storage conveyor for preventing the operation of the said last-mentioned indexing means.

3. Apparatus for transferring cord bundles periodically discharged from a supply conveyor to carrier hooks continuously advancing along a monorail conveyor, which comprises an endless chain conveyor, a plurality of bundle receiving pallets attached to the chain conveyor at uniformly spaced intervals therealong, means periodically operated in timed relationship with the supply conveyor for indexing the chain conveyor in one direction to position an empty pallet for receiving a bundle discharged from the supply conveyor, and means operable periodically during a predetermined time interval for indexing the chain conveyor in the opposite direction whenever a carrier hook approaches the discharge end of the chain conveyor to transfer a bundle from a loaded pallet onto the advancing carrier hook.

4. Apparatus for transferring cord bundles periodically discharged from a supply conveyor to carrier hooks continuously advancing along a monorail conveyor, which comprises an endless chain conveyor, a plurality of bundle receiving pallets attached to the chain conveyor at uniformly spaced intervals therealong, means periodically operated in timed relationship with the supply conveyor for indexing the chain conveyor in one direction to position an empty pallet for receiving a bundle discharged from the supply conveyor, means operable periodically during a predetermined time interval for indexing the chain conveyor in the opposite direction whenever a carrier hook approaches the discharge end of the chain conveyor to transfer a bundle from a loaded pallet onto the advancing carrier hook, and means for rendering the chain conveyor inoperative whenever a carrier hook carrying a bundle approaches the discharge end of said chain conveyor.

5. Apparatus for forming cords continuously delivered at a predetermined rate from a cord processing machine into bundles and transferring said bundles to carrier hooks continuously advancing along a monorail conveyor, which comprises an endless belt conveyor positioned for receiving the individual cords from the cord processing machine, means for automatically periodically indexing the conveyor so as to form bundles of a predetermined number of cords at uniformly spaced positions on the conveyor, the indexing movement normally causing a leading bundle positioned on said conveyor to be discharged therefrom, an intermediate, endless belt conveyor, means for automatically periodically indexing the intermediate conveyor in one direction for receiving the bundle discharged from the first-mentioned conveyor, means periodically operable when an advancing hook reaches a bundle transfer point adjacent to the storage conveyor for indexing said storage conveyor in the opposite direction whereby a bundle is discharged therefrom onto the passing hook, and inspection means for preventing the intermediate conveyor from operating in the opposite direction to transfer a bundle to a passing hook whenever said hook is already loaded.

6. Apparatus for forming cords continuously delivered at a predetermined rate from a cord processing machine into bundles and transferring said bundles to carrier hooks continuously advancing along a distributing conveyor, which comprises an endless belt conveyor positioned for receiving the individual cords from the machine, means for automatically periodically indexing the belt conveyor so as to form bundles of a predetermined number of cords at uniformly spaced positions on said belt conveyor, the indexing movement normally resulting in the discharge of a leading bundle positioned on the belt conveyor from the discharge end thereof, an intermediate endless chain conveyor, a plurality of pallets attached to the chain conveyor at uniformly spaced intervals therealong, means for automatically periodically indexing the chain conveyor in a reverse direction to position an empty pallet beneath the discharge end of the belt conveyor for receiving a bundle subsequently discharged therefrom, means operable during a predetermined portion of the time interval between successive indexing movements of the belt conveyor for indexing the chain conveyor in a forward direction to discharge a bundle from a leading pallet thereon, means for actuating the forward indexing means when an advancing carrier hook is positioned for receiving a bundle discharged from the chain conveyor to transfer the bundle to the hook, and means actuated by a bundle on a loaded carrier hook approaching the discharge end of the chain conveyor for preventing the operation of the forward indexing means.

References Cited in the file of this patent

UNITED STATES PATENTS

| | | |
|---|---|---|
| 1,923,548 | Mason | Aug. 22, 1933 |
| 2,384,385 | Madeira | Sept. 4, 1945 |
| 2,629,483 | Schweiter | Feb. 24, 1953 |